W. S. LANG.
BRUSH BACK BORING MACHINE.
APPLICATION FILED JAN. 16, 1915.

1,251,056.

Patented Dec. 25, 1917.
7 SHEETS—SHEET 1.

WITNESSES

INVENTOR
W. S. Lang

W. S. LANG.
BRUSH BACK BORING MACHINE.
APPLICATION FILED JAN. 16, 1915.

1,251,056.

Patented Dec. 25, 1917.
7 SHEETS—SHEET 3.

WITNESSES
R. A. Balderson
W. C. Lyon

INVENTOR
W. S. Lang
by Bakewell, Byrnes & Parmelee
Attys

W. S. LANG.
BRUSH BACK BORING MACHINE.
APPLICATION FILED JAN. 16, 1915.

1,251,056.

Patented Dec. 25, 1917.
7 SHEETS—SHEET 4.

WITNESSES

INVENTOR
W. S. Lang

W. S. LANG.
BRUSH BACK BORING MACHINE.
APPLICATION FILED JAN. 16, 1915.

1,251,056.

Patented Dec. 25, 1917.
7 SHEETS—SHEET 6.

W. S. LANG.
BRUSH BACK BORING MACHINE.
APPLICATION FILED JAN. 16, 1915.

1,251,056.

Patented Dec. 25, 1917.
7 SHEETS—SHEET 7.

WITNESSES

INVENTOR
W. S. Lang

UNITED STATES PATENT OFFICE.

WALTER S. LANG, OF PITTSBURGH, PENNSYLVANIA.

BRUSH-BACK-BORING MACHINE.

1,251,056.   Specification of Letters Patent.   Patented Dec. 25, 1917.

Application filed January 16, 1915. Serial No. 2,678.

*To all whom it may concern:*

Be it known that I, WALTER S. LANG, a citizen of the United States, residing at Pittsburgh, Allegheny county, Pennsylvania, have invented a new and useful Improvement in Brush-Back-Boring Machines, of which the following is a full, clear, and exact description, reference being had to the accompanying drawings, forming part of this specification, in which—

This invention relates to partially automatic machines for boring holes in brush backs for receiving the bristles, and is designed to provide an efficient device of this character, in which a plurality of backs can be simultaneously drilled or bored. One of the objects of my invention is to provide a device of this character in which a plurality of drills are simultaneously rotated and moved toward the blanks to be drilled. A further object of my invention is to provide means for simultaneously adjusting a plurality of blanks to present new surfaces to the drills, as well as to change the angular positions of the backs.

The precise nature of my invention will be best understood by reference to the accompanying drawings, which will now be described, it being premised, however, that various changes may be made in the details of construction and the general arrangement of the parts, without departing from the spirit and scope of my invention as defined in the appended claims.

Referring to Figs. 1 to 10, the reference character 2 designates the bed plate of the machine, which is mounted on legs 3. 4 is a vertically adjusted table with downwardly extending lugs 5 which are adjustably mounted in guides 6 on the bed plate. Slidably mounted on the top of the adjustable table is a transverse slide 7, which is provided with dove-tailed ribs 8 mounted in guides in the table 4, and slidably mounted on the transverse slide 7 is a longitudinal slide 9, which is connected to the transverse slide by means of securing devices 10. Secured to the bed plate 2 along one side thereof and extending upwardly therefrom are drill spindle frames 11; and journaled in each of these frames is a tool spindle 12 having a chuck 13 for receiving a drill 14. These drill spindles are arranged to reciprorate and rotate in the frames 11 and are each provided with a driving pulley 15. 16, 16 are transverse shafts journaled in bearings 17 mounted on the bed plate 2, and connected to each of these shafts is a driving pulley 18. 19 are belts connecting the driving pulleys 18 with the pulleys 15 on the drill spindle. Each of the driving pulleys 18 has three belts connected thereto which overlap each other as clearly shown in Fig. 1. Journaled in bearings extending downwardly from the bed plate 2 is a main driving shaft 20, which is provided with a pulley 21 connected to any suitable source of power. 22 is a pulley connected to the driving shaft 20 and connected to this pulley and to pulleys 23, 23 on the shafts 16 are belts 24, so that the spindle driving shafts on opposite ends of the machine are driven at the same speed and from the same power shaft. 25 are cam shafts which are arranged parallel to the main power shaft 20, there being one on each side of the power shaft, and are driven directly from the power shaft by means of a pinion 26 on the power shaft which meshes with gear wheels 27 on the shafts 25. Connected to each of the gear wheels 27 or to the shafts 25 in any desired manner are cams 28, which are duplicates of each other and are arranged to rock a frame 29. This frame 29 is provided with a longitudinal bar at its lower end, and connected thereto are a plurality of arms 30 which are pivoted at 31 to lugs on the bed plate. The upper end of each of these arms is connected by means of a ball and socket joint 32 with one of the drill spindles, so that when the frame 29 is rocked, all of the drill spindles will be simultaneously reciprocated.

Figure 7:
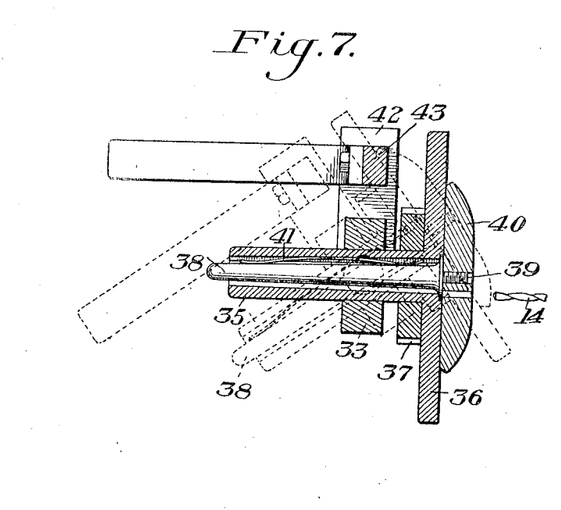
Fig. 7 is a detailed sectional view of one form of back holders.
Figure 8:
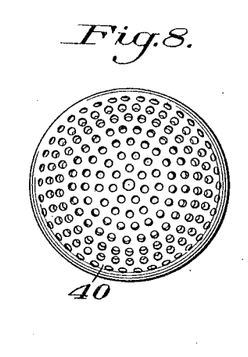
Fig. 8 is a face view of one form of back which has already been drilled.
Figure 9:
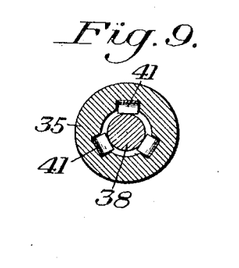
Fig. 9 is a detailed sectional view through a spindle of a holder for the back shown in Fig. 7.
Figure 10:
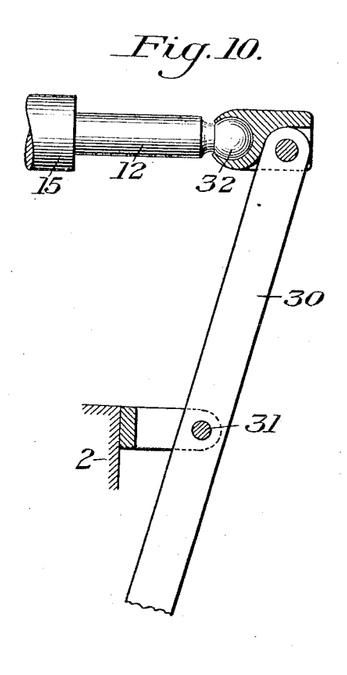
Fig. 10 is a detailed sectional view of the drill spindle operating device.

Journaled in upwardly extending lugs on the longitudinal slide 9 is a bar 33 which is arranged to be rocked by means of an adjusting lever 34, for the purpose hereinafter described. 35 are hollow spindles journaled in the bar 33, there being one spindle for each drill spindle, and as all of the spindles are duplicates, I will only describe the mechanism of one of them. The spindle 35 is provided with a disk 36 on one end thereof, and connected to this spindle adjacent to the disk 36, is a ratchet wheel 37. 38 is a brush back spindle within the hollow spindle 35, the outer end of which is provided with a screw 39 for connecting thereto the brush back 40, such as shown in Fig. 8 of the drawings. The spindle 38 is held in position in the spindle 35 by means of leaf friction springs 41 seated in grooves in the spindle 35.

Figures 4, 5, 6:
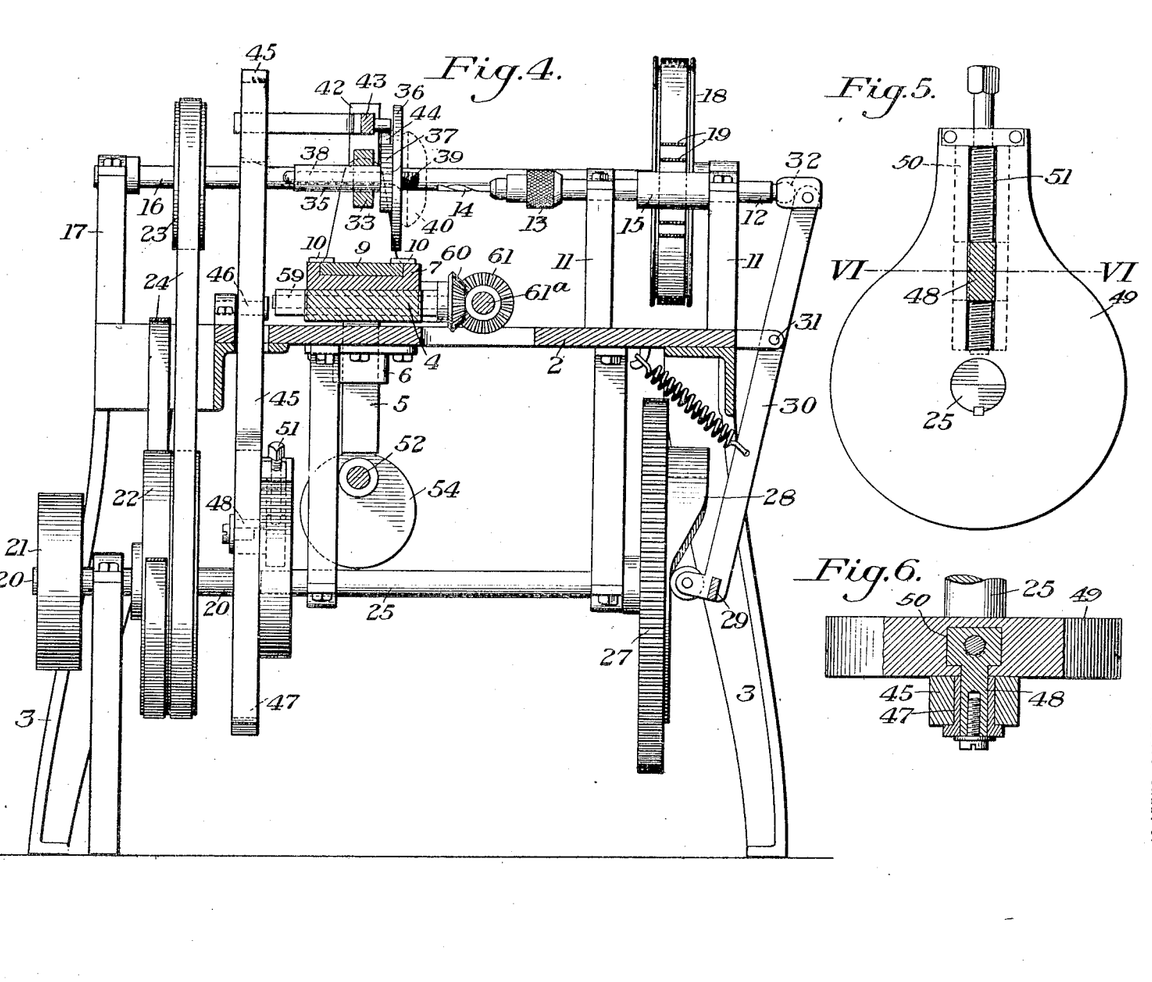
Fig. 4 is a transverse section.
Fig. 5 is a detail view of a crank for shifting the brush back holders.
Fig. 6 is a sectional view on the line VI—VI of Fig. 5.

Mounted in guides 42 on the bar 33 is a reciprocating bar 43, which is provided with pawls 44, there being one pawl for each ratchet wheel 37, which are arranged to rotate the ratchet wheel 37, together with the spindles 35 and 38 to rotate the brush backs 40 as hereinafter described. This bar is reciprocated by means of a rocking lever 45 pivoted to the frame of the machine at 46. The lower end of this rock bar is provided with a slot 47 in which is mounted a crank pin 48 on the crank 49. The crank 49 is provided with a T slot 50 for receiving the squared end of the crank pin 48, and is adjusted along the slot by means of a screw 51 to vary the throw of the rocking bar 45.

Figure 1:
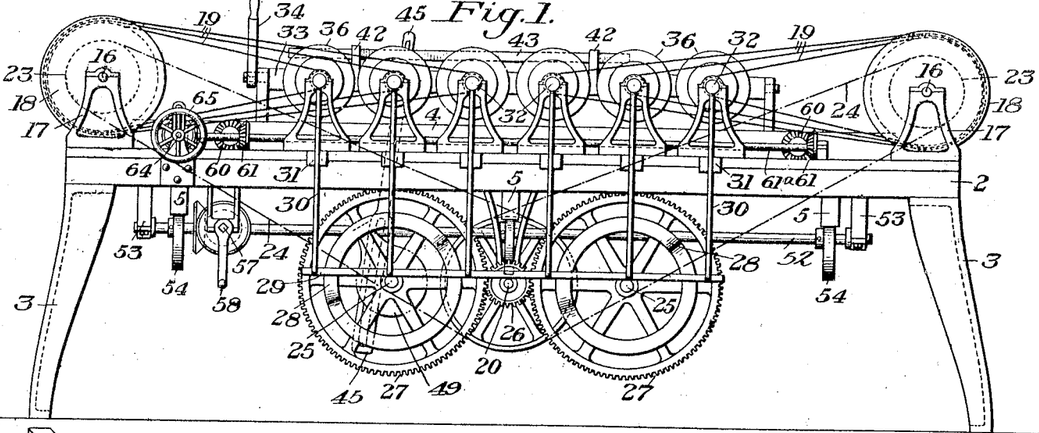
Figure 1 is a side elevation of one form of my improved brush boring machine.
Figure 3:
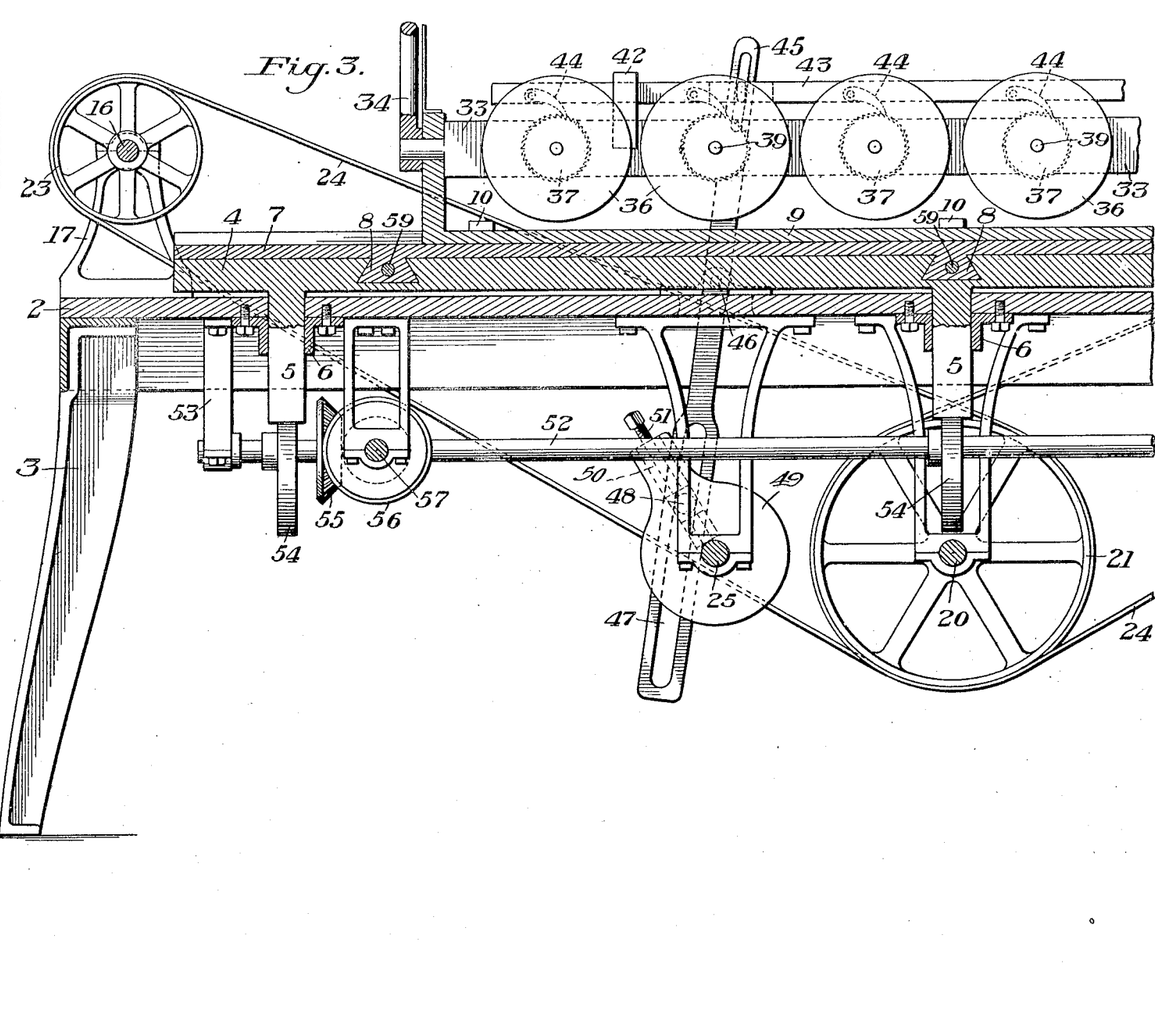
Fig. 3 is a longitudinal section of a portion of the machine.

In order to adjust the table 4, I provide a longitudinal shaft 52, which is journaled in bearings 53 extending downwardly from the bed plate in the machine. This shaft is provided with cams 54 which bear against the lower faces of the projections 5 which extend downwardly from the table 4. This shaft 52 is rotated by means of beveled gears 55 and 56, the beveled gear 56 being connected to a transverse shaft 57 having a handle 58 on the outer end thereof for actuating the shaft and adjusting the table.

Figure 2:
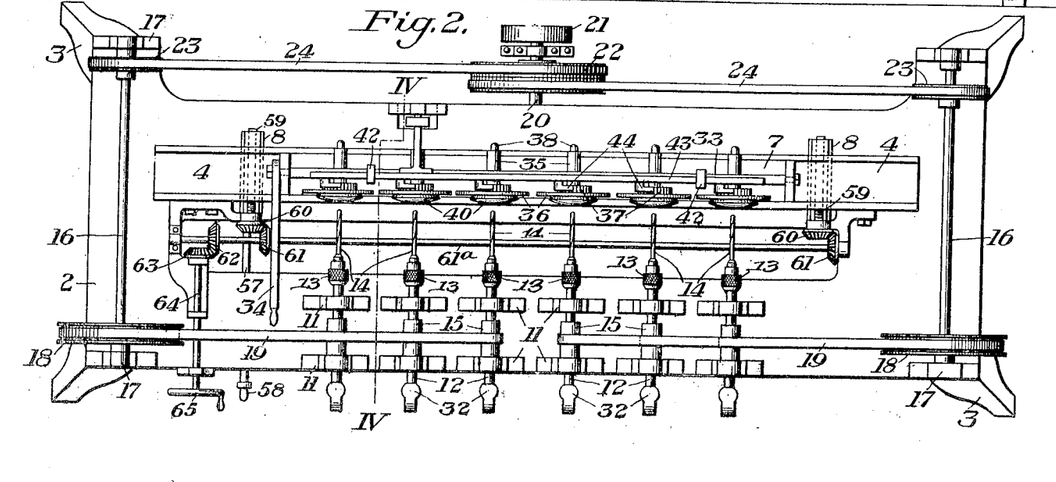
Fig. 2 is a plan view thereof.

The transverse slide 7 is adjusted transversely on the table by means of screws 59 having a screw threaded engagement with the dove-tailed guide projections 8. The outer ends of these screws are provided with bevel gears 60 which mesh with bevel gears 61 on the longitudinal shaft 61ª mounted in bearings above the bed plate. This shaft 61ª is also provided with a bevel gear 62 which meshes with the bevel 63 on the operating shaft 64, having an operating handle 65 at the outer end thereof, the arrangement being such that when the shaft 64 is actuated, both ends of the transverse slide will be simultaneously adjusted across the table 4.

The operation of the device is as follows:

The backs to be drilled are secured to the spindles as before described, and the throw of the rocker arm adjusted to move the brush back spindles the proper distance, and the bar 33 is adjusted so as to present the blanks at the proper angle with relation to the drills. The machine is then started so that all of the drill spindles are rotated and reciprocated, to move them toward the blanks to drill one opening in each blank, and as soon as the drills are withdrawn from the drilled openings the blanks will be rotated to bring them into position to drill the next set of holes. The operation is repeated until all of the holes in the outer annular rows of the blanks are drilled. The shaft 52 is then rotated to raise the table a distance equal to the distance between the first and second rows of holes in the blanks and the bar 33 is adjusted to place the blanks in the proper angular positions for drilling the second row of holes, and after the proper adjustments have been made the second row of holes is drilled in each of the blanks. This operation is repeated until all the holes in the blanks have been drilled.

In Figs. 11 to 16, I have shown a machine which is somewhat similar to the machine just described and in which I have designated all of the similar parts with the same reference characters, with the letter "a" affixed. This machine is more particularly designed for drilling or boring brush blanks such as shown in Figs. 17, 18 and 19.

Figure 17:
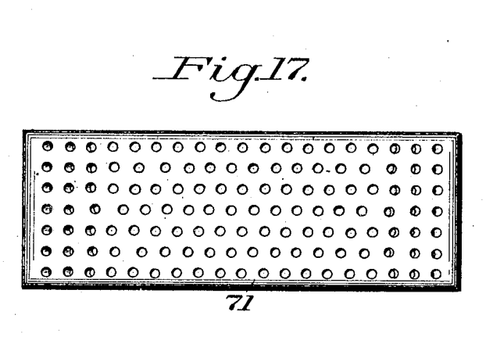
Figs. 17 and 18 are face views of brush backs which have been drilled in the machine such as shown in Figs. 11 and 12.
Figure 18:
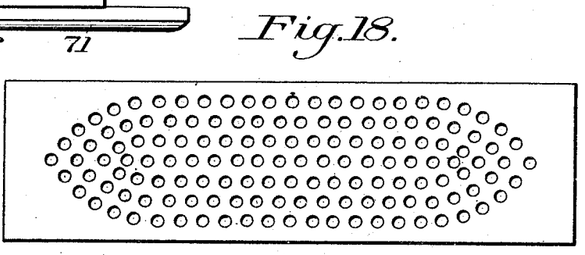

For drilling blanks such as shown in Figs. 17 and 18, the blanks must be shifted at various angles while drilling openings at different points, so that the bristles secured within the openings in the back will extend in the proper directions. The blank, such as shown in Fig. 17, need not be rotated like the blank shown in Fig. 8, but must be moved laterally and vertically. Blanks such as shown in Fig. 18 are moved laterally and vertically and are also rotated when drilling the openings in the ends.

Figure 19:
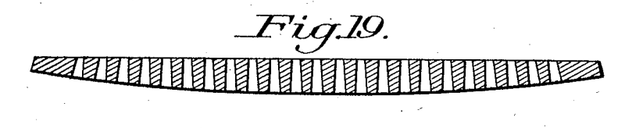
Fig. 19 is a transverse sectional view through the back, such as shown in Fig. 18.

In Figs. 11 to 15, I have illustrated a machine for drilling backs such as shown in Figs. 17 to 19.

Figure 11:
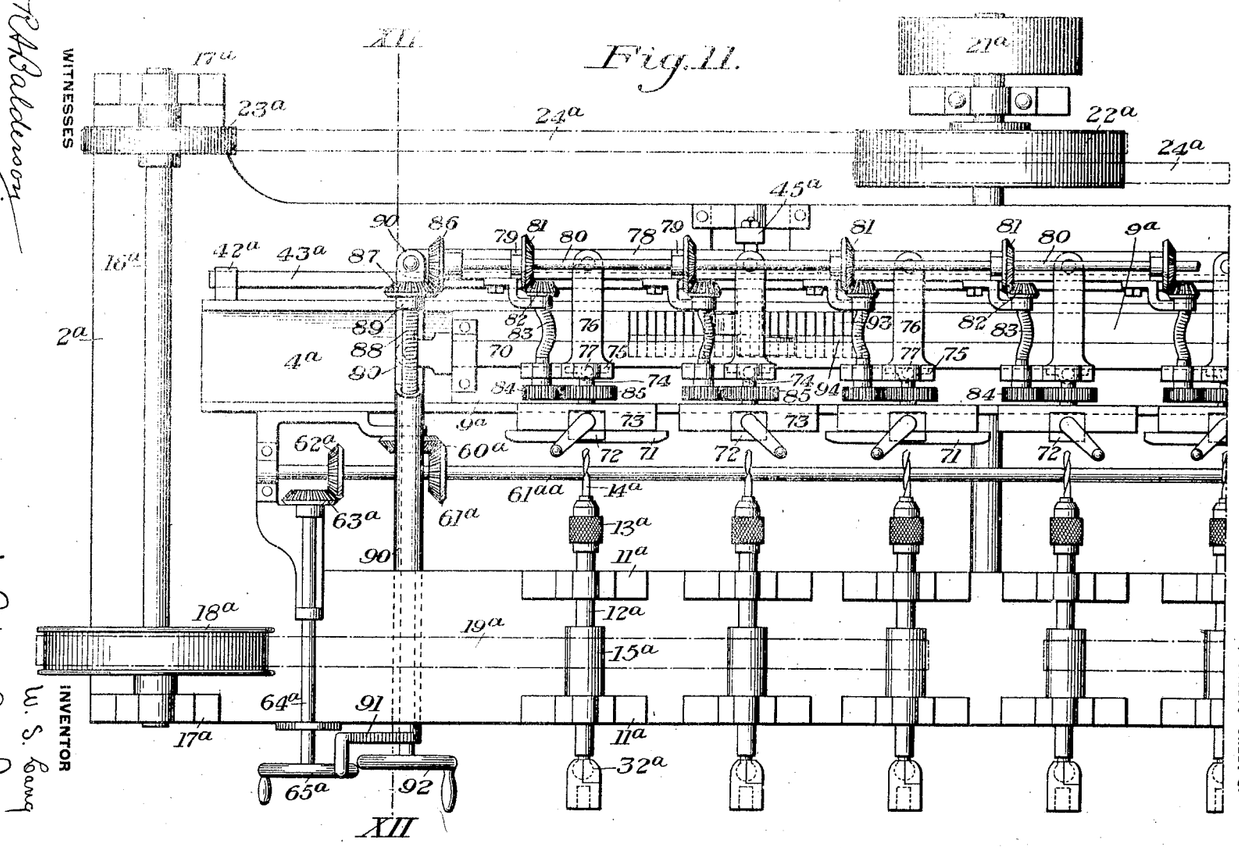
Fig. 11 is a plan view of another form of a machine illustrating my invention.
Figures 12, 13, 14:
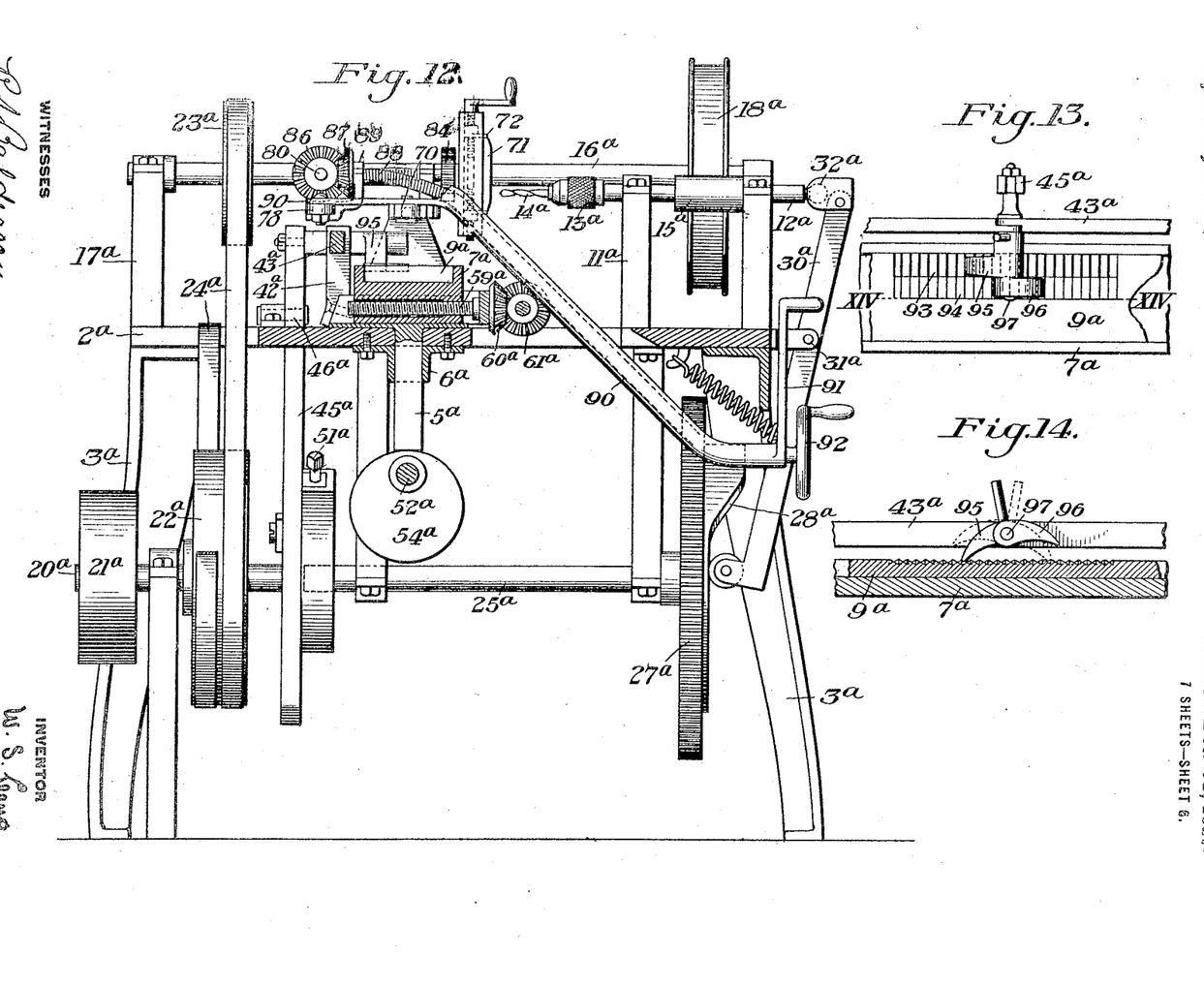
Fig. 12 is a sectional view on the line XII—XII of Fig. 11.
Fig. 13 is a detail plan view of the longitudinal slide operating mechanism for a machine such as shown in Figs. 11 and 12.
Fig. 14 is a sectional view on the line XIV—XIV of Fig. 13.
Figure 15:
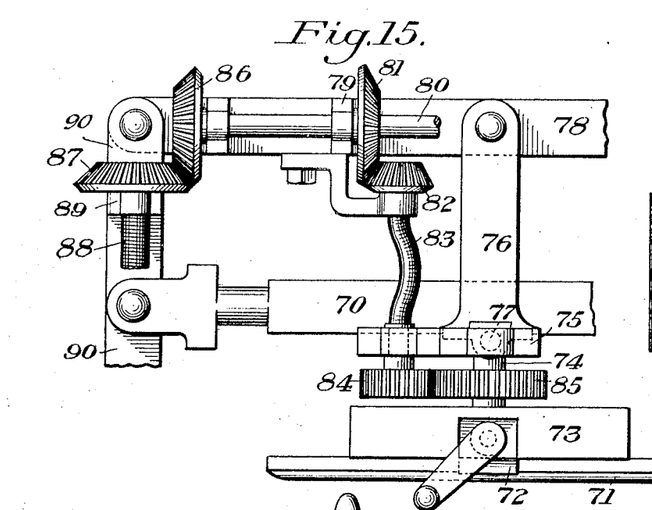
Fig. 15 is a detail plan view of the back holding spindle, together with a portion of its adjusting mechanism.
Figure 16:
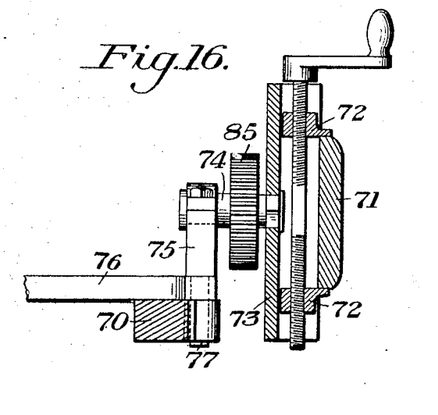
Fig. 16 is a detailed sectional view of one form of clamp for holding brush backs.

In this device there is a supporting bar 70 journaled in upright projections on the longitudinal slide 9ª, which carries all of the mechanism for holding and shifting the brush backs with relation to the drills. As all of the brush back holding devices are the same, I will only describe the connections for one of them. The brush back 71 is held between jaws 72 on the frame 73, which is connected to a spindle 74 journaled in a standard 75 having a spindle 77, which extends through one end of a lever 76 and is journaled in a bearing on the bar 70. The other end of the lever 76 is pivoted to a longitudinal bar 78 having bearings 79 for a longitudinal shaft 80. 81 is a bevel gear on the shaft 80 which meshes with the bevel gear 82 on one end of a flexible shaft 83. The other end of the flexible shaft is provided with a spur gear 84 which meshes with a spur gear 85 on the spindle 74. The shaft 83 is journaled in the standard 75 and a bearing extending from the longitudinal frame 78. Connected to one end of the shaft 80 is a bevel gear 86 which meshes with a bevel gear 87 on the end of the flexible shaft 88. The flexible shaft 88 is journaled in a bearing 89 on the lever 90 pivotally mounted on one end of the supporting bar 70, and is also pivotally connected to the longitudinal bar 78. This lever 90 is provided with a sleeve through which the flexible shaft 88 extends, and is also provided with a handle 91 for shifting the longitudinal bar in a longitudinal direction to swing the lever 76 about its pivotal connection 77 and thereby change the angular position of the brush backs when viewed from above. By raising and lowering the lever 90 by means of the handle 91, the entire mechanism for supporting and shifting the brush backs is rocked about the axis of the supporting bar 70, to change the angular position of the brush backs when viewed from the sides or ends. Of course, it will be understood that there is sufficient clearance between the bevel gears 86 and 87 to permit longitudinal movement of the bar 78. The end of the flexible shaft 88 is provided with a hand wheel 92 for rotating the shafts 88 and 80, and through the various connections the brush backs are rotated about the axis of the spindles 74.

The vertical adjustment is obtained in the same manner as that shown in the machine previously described, namely, by means of the cams 54ª on the shaft 52ª.

In order to shift the slide 9ª as well as the bar 70 and all the parts supported thereby longitudinally in both directions, I provide two sets of ratchet teeth 93 and 94 on the top thereof, which are engaged by the pawls 95 and 96, respectively, for moving the slide, the direction of movement depending upon which of the pawls shown in Fig. 14, is in engagement with the teeth. These pawls are connected to a pin 97 which is in turn connected to a reciprocating bar 43ª similar to the bar in the machine shown in Fig. 1, and which is operated by means of the rocking lever 45ª.

It will, therefore, be apparent that by rocking the lever 90 the brush backs are adjusted angularly about a vertical axis, and by raising and lowering the lever 90 the brush backs are adjusted angularly about a horizontal axis. The longitudinal movement of the backs is effected by shifting the slide 9ª, the vertical adjustment being effected by the cams 54ª, and the rotary adjustment being effected by the rotation of the handle 92 which in turn, through the medium of the various connections, rotates the spindles 74 on which the holding jaws are mounted.

The advantages of my invention result from the provision of a machine for simultaneously drilling a plurality of brush backs. Further from the provision of means for simultaneously shifting all of the brush backs in either a vertical or horizontal direction, as well as rocking the blanks in order to present them at various angles with relation to the drills for boring the holes.

I claim:

1. A brush back boring machine, comprising a plurality of bit spindles, bits mounted in said spindles, means for rotating said spindles, a rotary brush back holder in front of each bit, means for causing a relative movement of the brush back holders and bits toward and from each other, and means for rotating all of the brush back holders; substantially as described.

2. A brush back boring machine, comprising a plurality of bit spindles, a rotatable brush back holder in front of each of said spindles, means for relatively moving said spindles and brush back holders toward and from each other, and means for automatically rotating all of the brush back holders when the brush back holders and drill spindles are relatively moved away from each other; substantially as described.

3. A brush back boring machine, comprising a plurality of bit spindles, a rotatable brush back holder in front of each spindle, means for rotating said spindles, means for moving said spindles toward and from the brush back holders, and means for automatically rotating the brush back holders when the drill spindles are moving away from the brush back holders; substantially as described.

4. A brush back boring machine, comprising a plurality of bit spindles, a table adjacent to said spindles, a transversely movable slide on said table, a longitudinally movable slide on said transverse slide, a brush back holding device in front of each bit spindle mounted on the longitudinal slide, driving mechanism for rotating the drill spindles, actuating mechanism for reciprocating the drill spindles connected to the driving mechanism, and automatic mechanism for rotating the brush back holders connected to the driving mechanism and arranged to rotate the brush back holders when the drill spindles are moved away from the brush back holders; substantially as described.

5. A brush back boring machine, comprising a plurality of bit spindles, driving mechanism for rotating said bit spindles, actuating mechanism for reciprocating said bit spindles, a cam for moving said actuating mechanism in one direction, a spring for returning said actuating mechanism, and gearing connecting the bit spindle rotating mechanism and the cam; substantially as described.

6. In a device of the character described comprising a vertically adjustable table, means for adjusting said table, a reciprocating slide mounted on said table, a longitudinally movable slide mounted on the reciprocating slide, an oscillating bar mounted on the longitudinally movable slide, and a plurality of brush back holders rotatably mounted on the oscillating bar; substantially as described.

7. In a device of the character described comprising a vertically adjustable table, means for adjusting said table, a reciprocating slide mounted on said table, a longitudinally movable slide mounted on the reciprocating slide, an oscillating bar mounted on the longitudinally movable slide, a plurality of brush back holders rotatably mounted on the oscillating bar, and means for oscillating said bar, together with means for simultaneously rotating all of the brush back holders; substantially as described.

8. In a brush back boring machine comprising a main frame, a plurality of bit spindles rotatably mounted in said frame, a driving pulley connected to each spindle, a shaft rotatably mounted on the frame, a pulley connected thereto, a driving belt connecting said last mentioned pulley and each of the pulleys on the driving spindles driven thereby, means to rotate said shaft, means to reciprocate the bit spindles, and actuating connections between the bit spindle rotating devices and the bit spindle reciprocating mechanism; substantially as described.

In testimony whereof, I have hereunto set my hand.

WALTER S. LANG.

Witnesses:
S. R. WILLOCK,
J. G. MARTIN.